United States Patent
Sibigtroth et al.

(10) Patent No.: US 7,743,184 B2
(45) Date of Patent: Jun. 22, 2010

(54) COHERENT ACCESS REGISTER DATA TRANSFER DEVICE AND METHODS THEREOF

(75) Inventors: James M. Sibigtroth, Round Rock, TX (US); Michael W. Rhoades, Austin, TX (US); Michael C. Wood, Pflugerville, TX (US); George E. Baker, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 526 days.

(21) Appl. No.: 11/510,369

(22) Filed: Aug. 25, 2006

(65) Prior Publication Data

US 2008/0126714 A1    May 29, 2008

(51) Int. Cl.
*G06F 13/00* (2006.01)
*G06F 3/00* (2006.01)
*G06F 13/14* (2006.01)
*G06F 13/28* (2006.01)

(52) U.S. Cl. .............. 710/52; 710/35; 710/55; 710/65; 710/305; 711/141

(58) Field of Classification Search ............ 370/351, 370/389, 394, 395.1, 428, 429; 710/1, 22, 710/33, 35, 52, 55, 62, 65, 66, 305, 306, 710/307; 711/711, 100, 117, 118, 141–147, 711/150, 200, 202, 210
See application file for complete search history.

(56) References Cited

U.S. PATENT DOCUMENTS 4,805,098 A * 2/1989 Mills et al. .............. 711/118
5,892,978 A * 4/1999 Munguia et al. .......... 710/33

\* cited by examiner

*Primary Examiner*—Alford W Kindred
*Assistant Examiner*—Richard Franklin

(57) ABSTRACT

Methods and a device for performing coherent access requests are disclosed. The methods include receiving a first address associated with a first write or read request. During a write operation, if the first address is associated with a coherent access register, data to be written is stored at a data latch that is connected to a plurality of coherent data access registers. A second address and second data associated with a second write request are received. If the second address matches the first address, the second data and the latched first data are written to the coherent access register. By latching the first data and simultaneously writing the latched first data and the second data, overall coherency of the written data is maintained.

19 Claims, 4 Drawing Sheets

US 7,743,184 B2

COHERENT ACCESS REGISTER DATA TRANSFER DEVICE AND METHODS THEREOF

FIELD OF THE DISCLOSURE

The present disclosure relates to data processing devices and more particularly to register access in a data processing device.

BACKGROUND

Data processing devices typically employ bus master modules that communicate with peripheral modules in the device. For example, a bus master of the data processing device can communicate with a peripheral module by writing data to or reading data from registers of the peripheral module via a data bus. To ensure proper operation of the data processing device, in some instances data is written to or read from the peripheral module registers coherently, so that all the data associated with an access request is read from or written to the register simultaneously, rather than in portions. For example, a register may contain information, such as timing information, that changes rapidly. If a first portion of the information is read at a first time from the register, and a second portion of the information is read at a later time, the two portions will no longer be coherent if the second portion has changed. However, in some devices, the size of the peripheral device registers exceeds the size of the data bus, requiring multiple data transfers over the data bus to access all of the data for a register, making it difficult to maintain coherency. To preserve coherency, each coherent access register can include its own shadow register. However, this effectively doubles the amount of register space required for each coherent access register.

Accordingly, it will be appreciated that an improved device and methods for performing coherent accesses would be advantageous.

DETAILED DESCRIPTION

Methods and a device for performing coherent access requests are disclosed. The methods include receiving a first address associated with a first write or read request. During a write operation, if the first address is associated with a coherent access register, data to be written is stored at a data latch that is connected to a plurality of coherent data access registers. A second address and second data associated with a second write request are received. If the second address matches the first address, the second data and the latched first data are written to the coherent access register. By latching the first data and simultaneously writing the latched first data and the second data, overall coherency of the written data is maintained.

During a read operation, if the first address is associated with a coherent access register, a portion of the data stored at the coherent access register is stored at the data latch while the remaining portion of data is provided to a data bus. A second address and second data associated with a second read request are received. If the second address matches the first address, the portion of data stored at the latch is provided to the data bus. By latching the first portion of data and providing that data over the bus after the second portion of data has been provided, overall coherency of the read data is maintained. In addition, because a single latch is used to maintain coherency for multiple coherent access registers, the device area is reduced.

Figure 1:
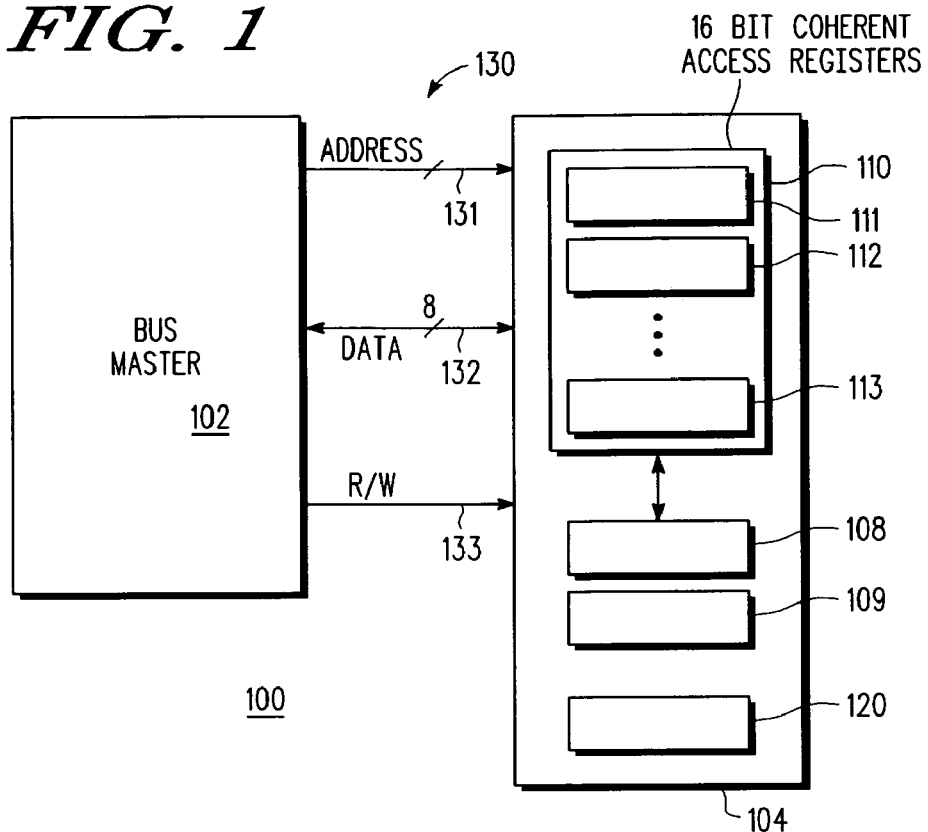
FIG. 1 is a block diagram of a particular embodiment of a data processing device that employs coherent accesses.

Referring to FIG. 1, a particular embodiment of a data processing device 100 is illustrated. The device 100 includes one or more bus masters including a bus master 102 connected to a peripheral module 104 via an inter-module bus 130 that includes an ADDRESS bus 131 (ADDRESS), an 8-bit DATA bus 132 (DATA) and a control bus including a read/write line 133 (R/W). It will be appreciated that the bus interface can have different size data and ADDRESS buses, as well as additional control signals. The bus master 102 can be a central processing unit (CPU), direct memory access (DMA) module, network control module, and the like. The peripheral module 104 can be e.g. a timer, communications interface, memory controller, a peripheral device control module, and the like. The bus master 102 and the peripheral module 104 can be at a single integrated circuit device or can be located at different integrated circuit devices.

The peripheral module 104 includes a number of registers that are larger than the size of the bus connecting peripheral module 104 to bus master 102, including 16-bit coherent access registers 110, which include coherent access registers 111, 112, and 113, and 16-bit registers 120 that are not coherent access registers. The peripheral module 104 also includes a data latch 108 connected to the coherent access registers 110, and an address latch 109.

During operation, the bus master 102 performs access (read and write) operations on the peripheral module 104. The access operations can be to coherent or non-coherent registers. It will be appreciated that the 16-bit registers 120 can be accessed using multiple read/write operations since they are non-coherent registers (i.e. do not contain coherent data). Accordingly, for purposes of discussion herein, a coherent access operation refers to an access operation to a register that stores data to, or reads data from, all bits in the register simultaneously and is larger than the DATA bus 132 between the bus master 102 and the peripheral 104, such as the 16-bit coherent access registers 110. Note that while peripheral module 104 can have 8-bit registers, they are not addressed herein because they are capable of being accessible by the bus master 102 during a single data access.

To perform a non-coherent access operation, the bus master 102 issues multiple access requests at inter-module bus 130 to read/write data to a non-coherent register in a non-simultaneous manner. Therefore, the peripheral module 104 stores the data received on the DATA bus 132 at the time of each access.

To perform coherent access operation, the bus master 102 issues multiple access requests at the inter-module bus 130 to read/write data to a coherent register in a simultaneous manner. The peripheral module 104 stores a first portion of the data to be written or read at the latch 108 that is connected to all of the coherent access registers 110. The data is stored at the latch 108 until it is written to the selected coherent access register (in case of a write access) or read by the bus master 102 (in the case of a read access).

To perform a coherent write request, the bus master 102 performs a series of write requests, sending a portion of the data to be written in each write request. For purposes of discussion, each write request in the series of write requests associated with a coherent write request are referred to as partial write requests. It will be appreciated that each partial write request includes the same characteristics as a non-coherent write request, including an address, data, and control information associated with the operation, and are referred to as partial write requests only to indicate that they are associated with a series of write requests that are used to implement a coherent write request.

For example, in a particular embodiment, to perform a coherent write to a coherent access register the bus master 102 sends a first partial write request to the peripheral module 104, including a first address via the ADDRESS bus 131 and a first data via the DATA bus 132. The peripheral module 104 decodes the first address and, in response to determining that it is associated with one of the coherent access registers 110, latches the first data at the latch 108 and stores the address at the latch 109.

To complete the coherent write request, the bus master 102 sends a second partial write request including a second address and a second data portion to the peripheral module 104, which compares the first address stored at the latch 109 to the second address to determine if the data stored at the latch 108 is related to the current partial write request. In response to detecting a match between the addresses, the peripheral module 104 simultaneously writes the first data stored in the latch 108 and the second data being provided at the DATA bus 132 during the current write cycle to the one of the coherent access registers 110 associated with the first and second addresses.

In one embodiment, the bus master 102 can send intervening write requests to non-coherent registers of the peripheral module 104 between the partial write requests. In that case, the data stored at the latch 108 is maintained until the second partial write request is received. Alternatively, the bus master 102 can initiate a new coherent write request to a different coherent register before a first coherent write request is completed. In this case, the data stored at the latch 108 is replaced by data associated with the new coherent write request and the new address replaces the address stored in latch 109.

To perform a coherent read request, the bus master 102 issues a series of read requests. For purposes of discussion, each read request in the series of read requests associated with a coherent read request are referred to as a partial read request. However, it will be appreciated that each partial read request includes all the characteristics of a non-coherent read request, including an address associated with the operation and control information, and are referred to as partial read requests only to indicate that they are associated with a series of read requests that are used to implement a coherent read request.

For example, to perform a coherent read of a coherent access register, the bus master 102 issues a first partial read request by sending an address via the ADDRESS bus 131. The peripheral module 104 determines that the address is associated with one of the coherent access registers 110. In response, the peripheral module latches a portion of the data stored at the associated register at the latch 108 and provides the remaining portion of the data via the DATA bus 132 and latches the first address at the latch 109. The bus master 102 then issues a second partial read request by sending a second address via the ADDRESS bus 131. In response to detecting a match between the second address and the first address stored at the latch 109, the peripheral module 104 provides the portion of the data stored at the latch 108 via the DATA bus 132. Accordingly, the coherency of the read data is maintained.

In one embodiment, the bus master 102 can send intervening write requests to non-coherent registers of the peripheral module 104 between the partial write requests. In that case, the data stored at the latch 108 is maintained until the second partial read request is received and the stored data is provided to the DATA bus 132. Alternatively, the bus master 102 can initiate a new coherent read request to a different coherent access register before a first coherent read request is completed. In this case, the peripheral module 104 can replace the stored data at the latch 108 with data associated with the new coherent read request and replace the stored address at the latch 109 with the address associated with the new coherent read request.

As discussed above, the latch 108 is used to facilitate coherent write and read requests for each of the coherent access registers 110. By employing a single register to perform coherent accesses, rather than employing a shadow register for each of the coherent access registers 110, the area of the circuitry used to perform the coherent accesses is reduced.

Figure 2:
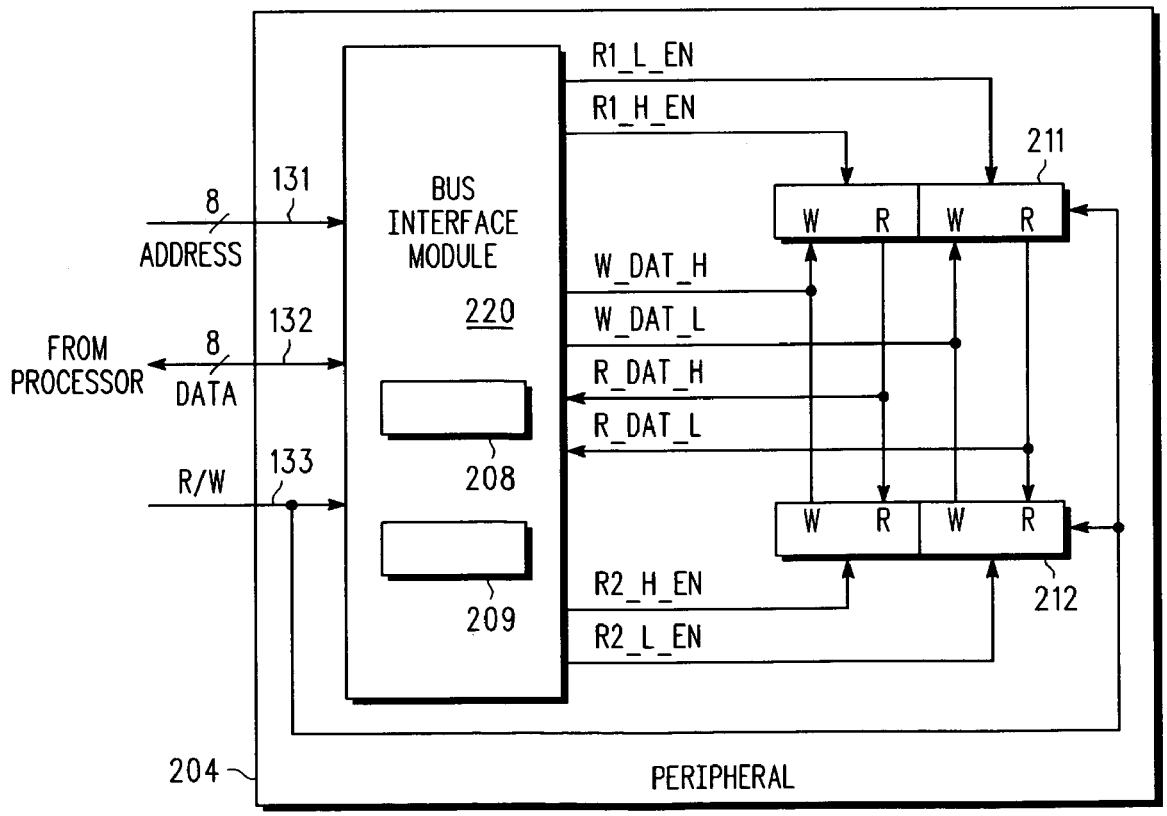
FIG. 2 is a block diagram of a particular embodiment of the peripheral module of FIG. 1.

Referring to FIG. 2, a block diagram of a peripheral module 204, corresponding to a particular embodiment of the peripheral module 104 of FIG. 1, is illustrated. The peripheral module 204 includes a bus interface module 220 and a plurality of coherent access registers including coherent access registers 211 and 212. The bus interface module 220 includes a set of address nodes connected to the ADDRESS bus 131 and a set of data input nodes connected to the DATA bus 132. In addition, the bus interface module 220 includes a plurality of enable outputs (R1_L_EN, R1_H_EN, R2_L_EN, R2_H_EN), a plurality of data bus outputs (W_DAT_H and W_DAT_L) and a plurality of data bus inputs (R_DAT_H and R_DAT_L). Further, the bus interface module 220 also includes a latch 208 corresponding to latch 108 of FIG. 1 and a latch 209 corresponding to latch 109 of FIG. 1. The coherent access register 211 includes a control input connected to the R/W line 133, two enable inputs connected to the outputs R1_L_EN and R1_H_EN respectively, two data inputs connected to the DATA bus 132 outputs W_DAT_H and W_DAT_L respectively, and two data outputs connected to the DATA bus 132 inputs R_DAT_H and R_DAT_L respectively. The coherent access register 212 includes a control input connected to the R/W line 133, two enable inputs connected to the outputs R2_L_EN and R2_H_EN respectively, two data inputs connected to the DATA bus 132 outputs W_DAT_H and W_DAT_L respectively, and two data outputs connected to the DATA bus 132 inputs R_DAT_H and R_DAT_L respectively.

During operation, to perform a coherent write request, the bus interface module receives a first address via the ADDRESS bus 131 and determines that the first address is associated with, for example, the coherent access register 211. In response, the bus interface module 220 latches the first data at the DATA bus 132 at the latch 208 and latches the address at the latch 209. The bus interface module 220 then waits until a second address is received via the ADDRESS bus 131 and compares the second address to the first address stored in the latch 209. In response to determining a match between the first and second addresses, the bus interface module 220 asserts signals at the outputs R1_L_EN and R1_L_EN to simultaneously write the first data stored in the latch 208 and the second data at the DATA bus 132 to the coherent access register 211.

To write the data to the coherent access register 211, the bus interface module 220 asserts the enable signals at the R1_L_EN output and the R1_H_EN output during the same write cycle and deasserts the enable signals to the other registers, thereby ensuring that data on the buses W_DAT_H and W_DAT_L will only be written to the appropriate register. The bus interface module also provides the data stored at the latch via the bus W_DAT_H and provides the data on the DATA bus 132 to the bus W_DAT_L, and the data on the buses is written to the coherent access register 211. Note that the specific embodiment described herein presumes that the most significant byte of a coherent access register is always written before the least significant byte. It will be appreciated that a module accommodating writing the most significant byte and the least significant byte of a coherent access register in any order is readily achievable.

To perform a coherent read request, the bus interface module 220 receives a first address via the ADDRESS bus 131 and determines that the address is associated with, for example, the coherent access register 211. The bus interface module 220 then asserts the enable signals R1_L_EN and R1_H_EN and deasserts the enable signals to the other registers, thereby ensuring that only the coherent access register 211 will provide data to the buses R_DAT_H and R_DAT_L. The data on one of the buses is latched at the latch 208 depending on the address received at the ADDRESS bus 131. The data that was not latched is provided via the DATA bus 132. After receiving a second address, the bus interface module 220 compares the second address with the first address stored in the latch 209 and, in response to finding a match between the addresses, provides the latched data via the DATA bus 132.

It will be appreciated that the first and second addresses for the read/write operations discussed herein can have different least significant bits and therefore a match between the addresses will typically be between only a portion of the complete address for each operation.

Figure 3:
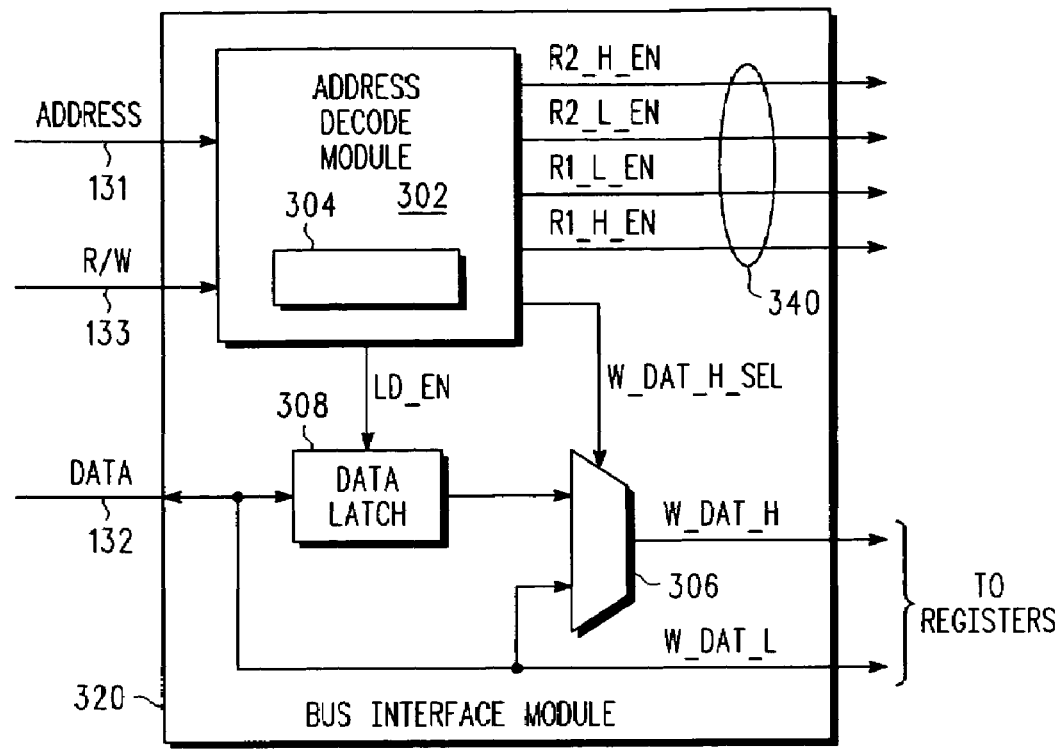
FIG. 3 is a block diagram of a particular embodiment of the bus interface module of FIG. 2.

Referring to FIG. 3, a block diagram of a bus interface module 320, corresponding to a particular embodiment of write control logic of the bus interface module 220 of FIG. 2 is illustrated. The bus interface module 320 includes an address decode module 302, a data latch 308 corresponding to the latch 108 of FIG. 1, and a signal select multiplexer 306. The address decode module 302 includes a set of address nodes connected to the ADDRESS bus 131, a control input connected to the R/W line 133, a plurality of enable outputs 340 (R1_L_EN, R1_H_EN, R2_L_EN, R2_H_EN), and a plurality of control outputs (W_DAT_H_SEL and LD_EN). The address decode module 302 also includes a latch 309, corresponding to the latch 109 of FIG. 1. The data latch 308 includes a number of data inputs connected to the DATA bus 132, a control input connected to the control output LD_EN, and a plurality of data outputs. The signal select multiplexer 306 includes a first set of data inputs connected to the data outputs of the latch 308, a second set of data inputs connected to the DATA bus 132, a control input connected to the control output W_DAT_H_SEL, and a number of data outputs connected to the bus W_DAT_H. A number of data signals from the data bus 132 bypass the multiplexer 306 to drive the W_DAT_L data bus to the registers.

During operation, to perform a coherent write request, the address decode module 302 receives a first address via the ADDRESS bus 131, decodes the address, and determines whether the first address is associated with a coherent access register. Based on the decoded address, the address decode module 302 asserts a signal via the output LD_EN so that the data provided by the DATA bus 132 is latched at the latch 308. The address decode module also latches the first address at the latch 309.

After the data has been latched, the address decode module 302 waits until a second address is received via the ADDRESS bus 131, and then compares the received second address to the first address stored in the latch 309. Upon determining a match, the address decode module 302 asserts those enable signals at the enable outputs 340 for the register associated with the first and second addresses. Further, the address decode module 302 asserts the signal W_DAT_H_SEL, so that data previously stored in the latch 308 is provided via the bus W_DAT_H together with data at the DATA bus 132 being provided via the bus W_DAT_L, so that the data on the buses is simultaneously provided to the coherent access registers.

The bus interface module 320 can also perform write requests to a non-coherent register. In that case, the address decode module controls the signal select multiplexer 306 so that data provided by the DATA bus 132 is provided to the bus W_DAT_H. The same data is provided to the bus W_DAT_L. Accordingly, the data at the DATA bus 132 can be stored at either a high byte or a low byte of the non-coherent register by applying the appropriate enable signals at the enable outputs 340.

Figure 4:
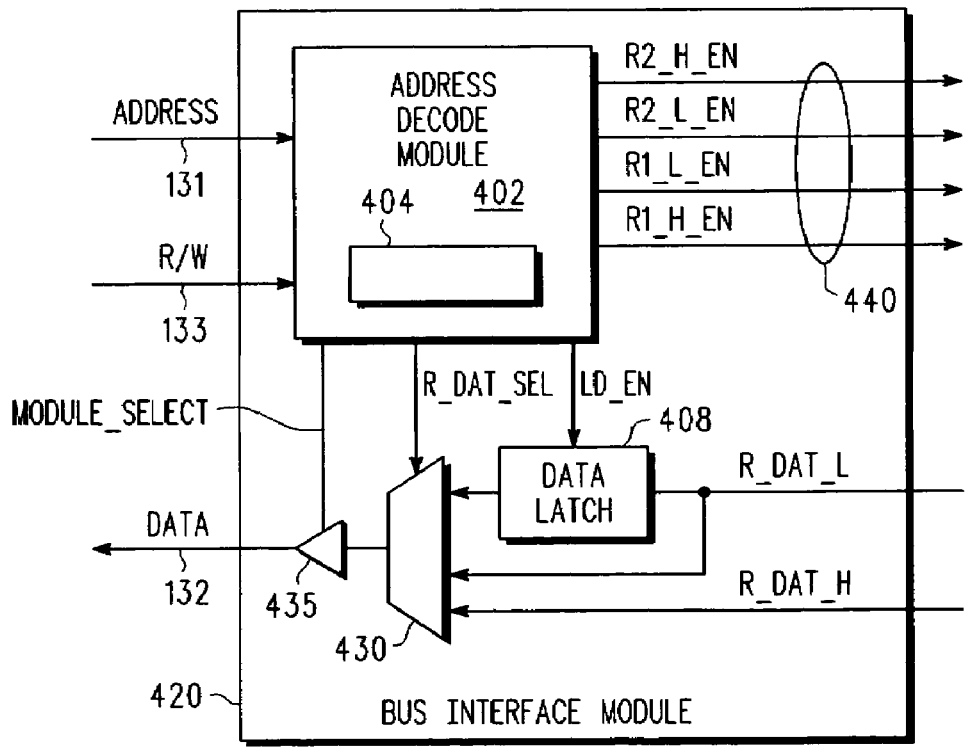
FIG. 4 is a block diagram of an alternative embodiment of the particular embodiment of the bus interface module of FIG. 2.

Referring to FIG. 4, a block diagram of a bus interface module 420, corresponding to a particular embodiment of read control logic of the bus interface module 220 of FIG. 2, is illustrated. The bus interface module 420 includes an address decode module 402, a data latch 408 corresponding to the data latch 108 of FIG. 1, signal select multiplexer 430, and buffer 435. The address decode module 402 includes a plurality of address nodes connected to the ADDRESS bus 131, a control input connected to the R/W line 133, a plurality of enable outputs 440 and a plurality of control outputs (MODULE_SELECT, LD_EN, and R_DAT_SEL). The address decode module also includes a latch 409 corresponding to the latch 109 of FIG. 1. The latch 408 includes a plurality of input nodes connected to the data bus R_DAT_L, a control input connected to the LD_EN output, and a plurality of data outputs. The signal select multiplexer 430 includes a plurality of data inputs connected to the outputs of the data latch 408, a plurality of data inputs from data bus R_DAT_L, a plurality of data inputs from data bus R_DAT_H, a plurality of outputs connected to buffer 435, and select inputs R_DAT_SEL from address decode module 402. Data buffer 435 includes a plurality of data inputs from multiplexer 430, a plurality of data outputs connected to the DATA bus 132, and the MODULE_SELECT input from address decode module 402.

During operation, to perform a coherent read request, the address decode module 402 receives a first address via the ADDRESS bus 131, decodes the address, and determines that the first address is associated with one of the coherent access registers 110. In response, the address decode module 402 asserts the enable signals for the selected coherent access register, and deasserts the control signals for the remaining registers, so that the data stored in the high portion of the selected coherent access register is provided to the R_DAT_H bus and the data stored in the lower portion is provided to the R_DAT_L bus.

Further, the address decode module 402 asserts a signal at the LD_EN output so that the data from the R_DAT_L bus is latched into the data latch 408, while R_DAT_H is coupled to the multiplexer 430 and coupled to the data bus 132 through multiplexer 430 and buffer 435.

The address decode module 402 then waits until a second address is received, and determines if the second address matches the first address stored in the latch 409 to indicate that the second address correlates to the stored data. If a match is detected, the address decode module controls the signal select module 430 so that the data stored at the latch 408 is provided to the DATA bus 132, thereby providing the lower portion of data from the coherent access register to the bus master 102, and maintaining coherency between the upper and lower portions of data.

It will be appreciated that although, for purposes of discussion, the bus interface modules 320 and 420 have been illustrated separately, the two interface modules could be integrated as a single module that performs both coherent write and coherent read accesses.

Figure 5:
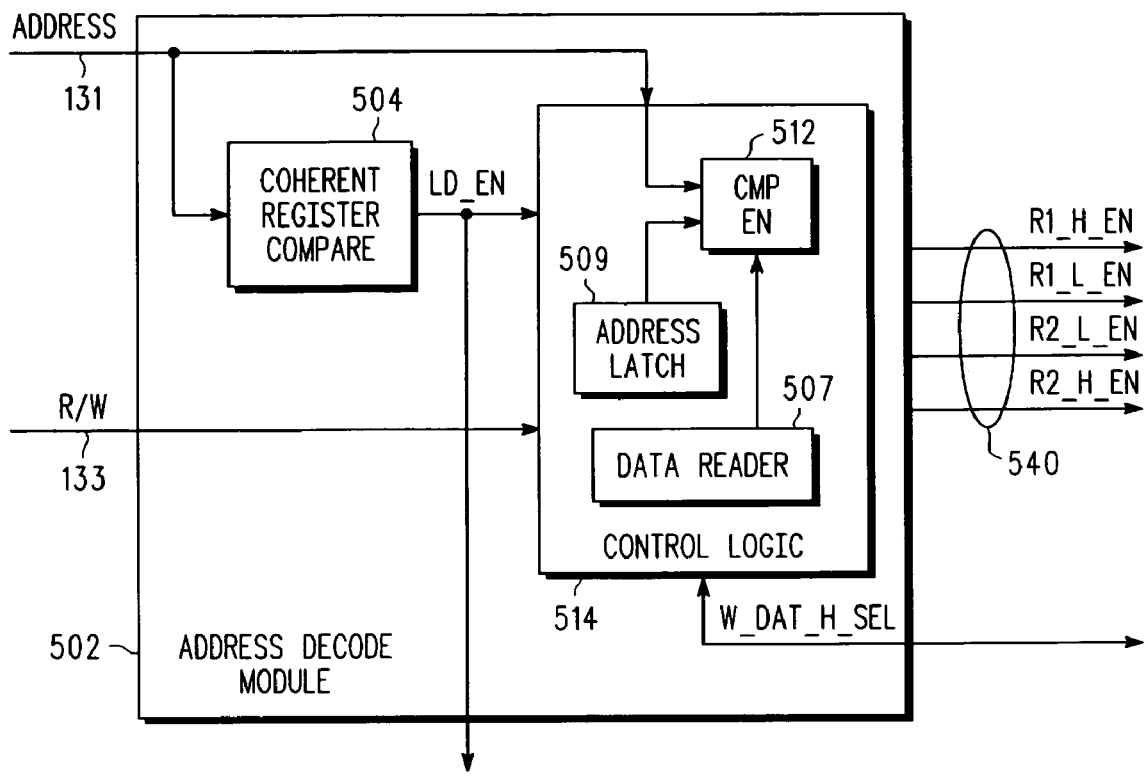
FIG. 5 is a block diagram of a particular embodiment of the address decode module of FIG. 3.

Referring to FIG. 5, a block diagram of an address decode module 502, corresponding to a particular embodiment of the address decode module 302 of FIG. 3, is illustrated. The address decode module 502 includes a coherent register compare module 504 and a control logic module 514. The coherent register compare module 504 includes a set of input nodes connected to the ADDRESS bus 131 and an output (LD_EN). The control logic module 514 includes a set of input nodes connected to the ADDRESS bus 131, the read/write line from control bus 133, an input connected to the LD_EN output, a set of enable outputs 540 (R1_L_EN, R1_H_EN, R2_L_EN, R2_H_EN), and a control output (W_DAT_H_SEL).

The control logic module 514 includes an address latch 509 corresponding to the latch 109 of FIG. 1, a comparator 512, and a data ready module 507. The address latch 509 includes a set of outputs. The comparator 512 includes a set of input nodes connected to the ADDRESS bus 131, a set of inputs connected to the outputs of the address latch, and a control input to receive an enable signal from the data ready module 507.

A write operation is initiated when the address decode module 502 receives an address via the ADDRESS bus 131. The coherent register compare module 504 compares the received address to the addresses associated with the coherent access registers 110 to determine if the address is associated with a coherent access register. If a coherent access register is indicated by the address, the coherent register compare module 504 asserts a signal at the output LD_EN. In response, the control logic module 514 latches the address at the address latch 509 and suppresses assertion of the enable signals, so that the first data portion received for the coherent write is latched at the latch 308, rather than written to the coherent access registers 110. In addition, the control logic module 514 sets the coherent data ready module 507 to indicate that the first partial write operation of a coherent write access has been received.

When the second address on the ADDRESS bus 131 is received to complete the coherent write request, the state of the coherent data ready module 507 indicates that the first portion of a coherent write access was previously received, the control logic module 514 determines that the second address is the second partial write operation of a coherent write access. In response, the control logic module 514 compares the second address to the latched first address at the comparator 512 and, if a match is determined, asserts the appropriate enable signals for the coherent access register associated with the first and second addresses. In addition, the control logic module 514 asserts a signal at the W_DAT_H_SEL output, so that the first data latched at the data latch 308 and the data at the DATA bus 132 are simultaneously written to the selected coherent access register, thereby performing a coherent write access to the register.

Figure 6:
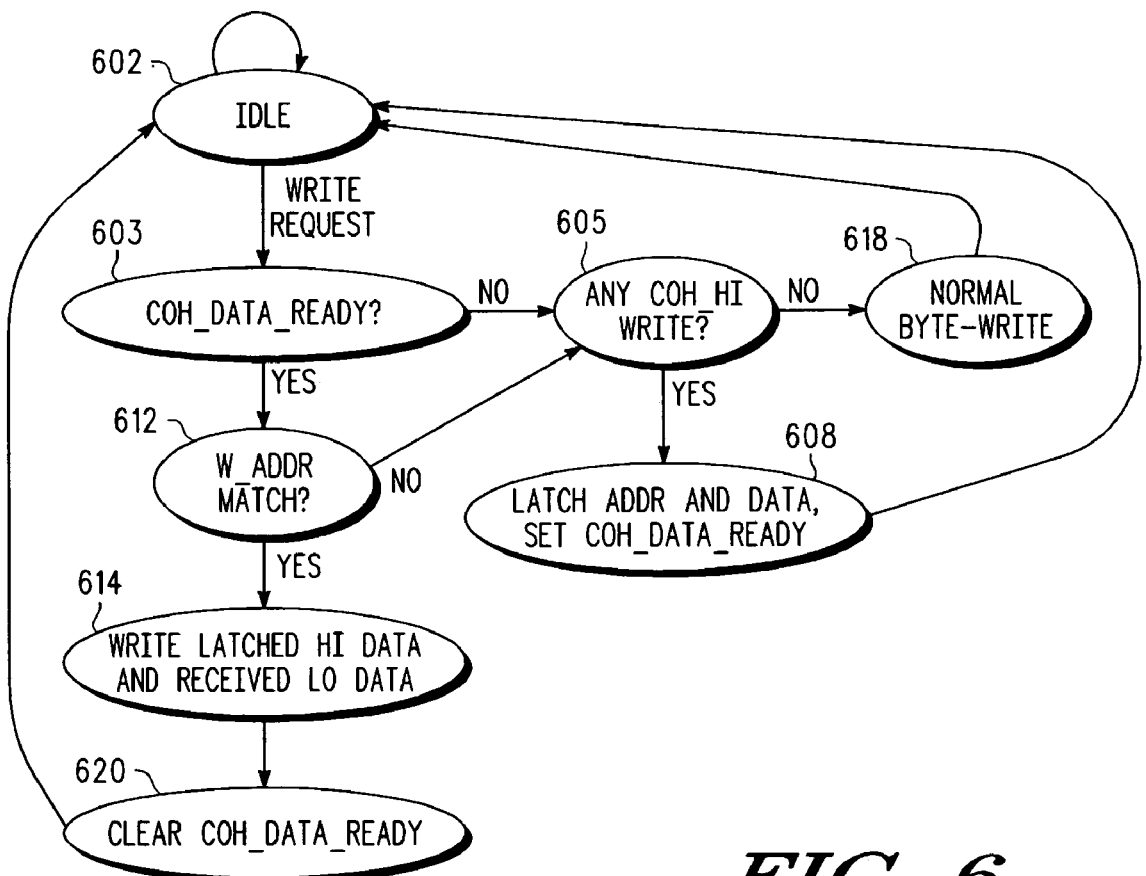
FIG. 6 is a flow diagram of a particular embodiment of a method of performing a write access to a coherent access register.

Referring to FIG. 6, a flow diagram of a particular embodiment of a method of performing a write access to a coherent access register is illustrated. At block 602, a bus interface module is idle. In response to a write request being received, the method flow moves to block 603 where a coherent data ready flag is checked to see if any coherent write access was previously started. If not, flow continues to block 605 where the bus interface module decodes the address associated with the write request. If the bus interface module determines that the decoded address is not associated with a coherent access register, the method flow moves to block 618 and the bus interface module writes the data associated with the write request to the storage location associated with the received address. The method flow then returns to block 602 and the bus interface module awaits another write request.

If, at block 605, the bus interface module determines that the received address is associated with a coherent access register, the method flow moves to block 608 and the bus interface module latches the data associated with the write request at a data latch, the address at an address latch, and the coherent data ready flag is set to indicate the first portion of a coherent access has been completed. The method flow then returns to block 602 and the bus interface module awaits another write request.

If at block 603, the bus interface module determines that a coherent write data access was previously started, the method flow moves to block 612 and the bus interface module determines whether the address associated with the most recently received write request matches the previously received address. If so, the method flow moves to block 614 and the data previously stored at the data latch, together with the data associated with the most recent write request, is written simultaneously to the coherent access register, thereby maintaining coherency of the data. The coherent data ready flag is then cleared in block 620 and flow then returns to block 602.

If the addresses do not match at block 612, the method flow moves to block 605 and the flow follows one of two paths depending upon whether the write request is a normal byte-write to a non-coherent register or the start of a new coherent write request that supersedes the previously started coherent write operation. In the case of a non-coherent write, flow proceeds to block 618 and then 602. In the case of the start of a new coherent write, flow proceeds to block 608 and then 602.

Figure 7:
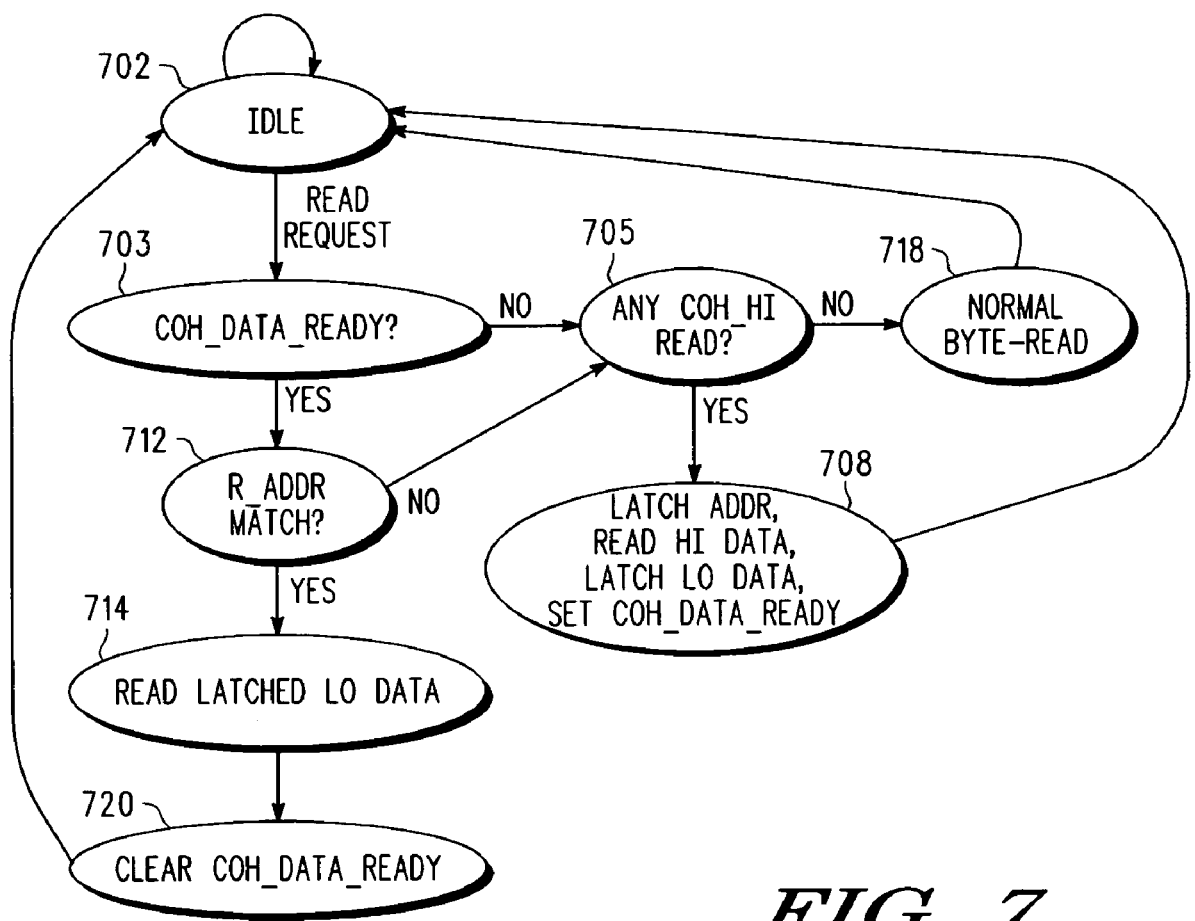
FIG. 7 is a flow diagram of a particular embodiment of a method of performing a read access from a coherent access register.

Referring to FIG. 7, a flow diagram of a particular embodiment of a method of performing a read access to a coherent access register is illustrated. At block 702, a bus interface module is idle. In response to receiving a read request, the method flow moves to block 703 where a coherent data ready flag is checked to see if any coherent read access was previously started. If not, flow continues to block 705 where the bus interface decodes the address associated with the read request. If the decoded address is not associated with a coherent access register, the method flow moves to block 718 and the bus interface module provides the data from the storage location associated with the address to a data bus. The method flow then returns to block 702 and the bus interface module waits for the next read access.

However, if the decoded address at block 705 is associated with a coherent access register, the method flow moves to block 708 and the bus interface module latches a first portion of data from the coherent access register, while the remaining portion of data is provided to the data bus, the address is latched, and the coherent data ready flag is set to indicate the first portion of a coherent access has been completed. The method flow then returns to block 702 and the bus interface module waits for a subsequent read request.

If at block 703, the bus interface module determines that a coherent read data access was previously started, the method flow moves to block 712 and the bus interface module determines whether there is an address match between the address associated with the most recently received read request and the previously received address. If there is a match, the method flow moves to block 714 and the bus interface module provides the data stored in the latch to the data bus, thereby preserving coherency between the latched data and the data previously provided to the data bus.

If there is not an address match at block 712, the method flow moves to block 705 and the flow follows one of two paths depending upon whether the read request is a normal byte-read to a non-coherent register or the start of a new coherent read request that supersedes the previously started coherent read operation. In the case of a non-coherent read, flow proceeds to block 718 and then 702. In the case of the start of a new coherent read, flow proceeds to block 708 and then 702. The operation of blocks 705, 718, and 708 were described in greater detail earlier.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present disclosure is not intended to be limited to the specific form set forth herein, but on the contrary, it is intended to cover such alternatives, modifications, and equivalents, as can be reasonably included within the spirit and scope of the disclosure. For example, although the embodiments disclosed herein have employed a single data latch connected to the coherent access registers, multiple latches may be used, where each latch is connected to a bank of coherent access registers. Further, although some of the particular embodiments disclosed herein have employed 16 bit coherent access registers and an 8-bit data bus, other configurations can be employed, such as an 8 bit bus and 32 bit coherent access registers. Such configurations may employ additional latches to perform each coherent access operations. It will further be appreciated that, although some circuit elements are depicted as connected to other circuit elements, the illustrated elements may also be coupled via additional circuit elements, such as resistors, capacitors, transistors, and the like.

What is claimed is:

1. A method, comprising:
   receiving at a first time a first write request comprising a first data and a first address value, wherein the first address value is received at a first set of address nodes;
   determining if the first address value is associated with one of a plurality of coherent access registers, wherein each one of the plurality of coherent access registers is to receive data from a plurality of write requests simultaneously;
   storing, in response to determining that the first address value is associated with a first register of the plurality of coherent access registers, the first data at a latch coupled to each of the plurality of coherent access registers;
   receiving at a second time after the first time a second write request comprising a second data and a second address value, wherein the second address value is received at the first set of address nodes;
   storing the second data at a second register while maintaining the first data at the latch in response to determining the second address value is not associated with any of the plurality of coherent access registers;
   receiving at a third time after the second time a third write request comprising a third data and a third address value, wherein the third address value is received at the first set of address nodes; and
   simultaneously storing, in response to determining that the third address value is associated with the first register of the plurality of coherent access registers, the first data stored at the latch and the third data at the first register of the plurality of coherent access registers.

2. The method of claim 1, further comprising:
   receiving at a fourth time a fourth write request comprising a fourth data and a fourth address value, wherein the fourth address value is received at the first set of address nodes;
   storing, in response to determining that the fourth address value is associated with a second register of the plurality of coherent access registers, the fourth data at the latch;
   receiving at a fifth time a fifth write request comprising a fifth data and a fifth address value, wherein the fifth address value is received at the first set of address nodes; and
   simultaneously storing, in response to determining that the fifth address value matches the fourth address value, the fourth data stored at the latch and the fifth data at the second register of the plurality of coherent access registers.

3. The method of claim 1, further comprising storing, in response to determining that the third address value is not associated with the first register of the plurality of coherent access registers, the third data at the latch.

4. The method of claim 3, further comprising:
   receiving at a fourth time a fourth write request comprising a fourth data and a fourth address value, wherein the fourth address value is received at the first set of address nodes;
   simultaneously storing, in response to determining that the fourth address value is associated with a second register of the plurality of coherent access registers, the data stored at the latch and the fourth data at a second of the plurality of coherent access registers.

5. The method of claim 3, wherein the third data is stored at the latch in response to determining that the third address value is associated with one of the plurality of coherent access registers.

6. The method of claim 5, further comprising storing, in response to determining that the third address value is not associated with one of the plurality of coherent access registers, the third data at a third register associated with the third address value, wherein the third register is not one of the plurality of coherent access registers.

7. The method of claim 1, further comprising latching the first address value at an address register in response to determining that the first address value is associated with one of the plurality of coherent access registers.

8. The method of claim 1, further comprising:
   receiving at a fourth time a fourth write request comprising a fourth data and a fourth address value, wherein the fourth address value is received at the first set of address nodes;
   determining if the fourth address value is associated with one of the plurality of coherent access registers;
   storing, in response to determining that the fourth address value is associated with a third register of the plurality of coherent access registers, the fourth data at the latch;

receiving at a fifth time a fifth write request comprising a fifth data and a fifth address value, wherein the fifth address value is received at the first set of address nodes; and simultaneously storing, in response to determining that the fifth address value matches the fourth address value, the fourth data stored at the latch and the fifth data at the third register of the plurality of coherent access registers.

9. The method of claim 8, further comprising storing, in response to determining that the fourth address value is not associated with the third register of the plurality of coherent access registers, the fourth data at the latch.

10. The method of claim 9, further comprising:
receiving at a sixth time a sixth write request comprising a sixth data and a sixth address value, wherein the sixth address value is received at the first set of address nodes;
simultaneously storing, in response to determining that the sixth address value is associated with a fourth register of the plurality of coherent access registers, the data stored at the latch and the sixth data at the fourth register of the plurality of coherent access registers.

11. The method of claim 9, wherein the fifth data is stored at the latch in response to determining that the fifth address value is associated with one of the plurality of coherent access registers.

12. A method, comprising:
receiving at a peripheral device at a first time a first write request comprising a first data and a first address value, wherein the first address value is received at a first set of address nodes from a bus master device;
receiving the first data at the peripheral device via a data bus coupled between the bus master device and the peripheral device;
determining if the first address value is associated with one of a plurality of coherent access registers at the peripheral device, wherein a size of a first register of the plurality of coherent access registers larger than a size of the data bus;
storing, in response to determining that the first address value is associated with the first register of the plurality of coherent access registers, the first data at a latch of the peripheral device coupled to each of the plurality of coherent access registers;
receiving at a second time a second write request comprising a second data and a second address value, wherein the second address value is received at the first set of address nodes; and
simultaneously storing, in response to determining that the second address value is associated with the first register of the plurality of coherent access registers, the first data stored at the latch and the second data at the first register of the plurality of coherent access registers without storing the second data at the latch.

13. The method of claim 12, further comprising:
receiving at a third time a third write request comprising a third data and a third address value, wherein the third address value is received at the first set of address nodes;
determining if the third address value is associated with one of the plurality of coherent access registers;
storing, in response to determining that the third address value is associated with a second register of the plurality of coherent access registers, the third data at the latch;
receiving at a fourth time a fourth write request comprising a fourth data and a fourth address value, wherein the fourth address value is received at the first set of address nodes; and simultaneously storing, in response to determining that the fourth address value matches the third address value, the third data stored at the latch and the fourth data at the second register of the plurality of coherent access registers.

14. The method of claim 12, further comprising storing, in response to determining that the second address value is not associated with the first register of the plurality of coherent access registers, the second data at the latch.

15. The method of claim 14, further comprising:
receiving at a third time a third write request comprising a third data and a third address value, wherein the third address value is received at the first set of address nodes;
simultaneously storing, in response to determining that the third address value is associated with a second register of the plurality of coherent access registers, the data stored at the latch and the third data at a second of the plurality of coherent access registers.

16. A method, comprising:
receiving at a first time a first write request comprising a first data and a first address value, wherein the first address value is received at a first set of address nodes;
determining if the first address value is associated with one of a plurality of coherent access registers, wherein each one of the plurality of coherent access registers is to receive data from a plurality of write requests simultaneously;
storing, in response to determining that the first address value is associated with a first register of the plurality of coherent access registers, the first data at a latch coupled to each of the plurality of coherent access registers;
receiving at a second time after the first time a second write request comprising a second data and a second address value, wherein the second address value is received at the first set of address nodes;
storing the second data at a second register while maintaining the first data at the latch in response to determining the second address value is not associated with any of the plurality of coherent access registers;
receiving at a third time after the second time a third write request comprising a third data and a third address value, wherein the third address value is received at the first set of address nodes; and
simultaneously storing, in response to determining that the third address value matches the first address value, the first data stored at the latch and the third data at the first register of the plurality of coherent access registers.

17. The method of claim 16, further comprising:
receiving at a fourth time a fourth write request comprising a fourth data and a fourth address value, wherein the fourth address value is received at the first set of address nodes;
determining if the fourth address value is associated with one of the plurality of coherent access registers;
storing, in response to determining that the fourth address value is associated with a second register of the plurality of coherent access registers, the fourth data at the latch;
receiving at a fifth time a fifth write request comprising a fifth data and a fifth address value, wherein the fifth address value is received at the first set of address nodes; and
simultaneously storing, in response to determining that the fifth address value matches the fourth address value, the fourth data stored at the latch and the fifth data at the second register of the plurality of coherent access registers.

18. The method of claim 16, further comprising storing, in response to determining that the third address value does not match the first address, the third data at the latch.

19. The method of claim 18, further comprising:
receiving at a fifth fourth time a fourth write request comprising a fourth data and a fourth address value, wherein the fourth address value is received at the first set of address nodes;

simultaneously storing, in response to determining that the fourth address value is associated with a second register of the plurality of coherent access registers, the data stored at the latch and the fourth data at a second of the plurality of coherent access registers.

* * * * *